United States Patent [19]
Rastegar

[11] Patent Number: 5,339,322
[45] Date of Patent: Aug. 16, 1994

[54] CACHE TAG PARITY DETECT CIRCUIT

[75] Inventor: Bahador Rastegar, Dallas, Tex.

[73] Assignee: SGS-Thomson Microelectronics, Inc., Carrollton, Tex.

[21] Appl. No.: 677,313

[22] Filed: Mar. 29, 1991

[51] Int. Cl.[5] .............................................. G06F 11/10
[52] U.S. Cl. ................................... 371/51.1; 371/49.2
[58] Field of Search ............................. 371/49.2, 51.1

[56] References Cited

U.S. PATENT DOCUMENTS

| | | | |
|---|---|---|---|
| 4,084,236 | 4/1978 | Chelberg et al. | 364/200 |
| 4,528,666 | 7/1985 | Cline et al. | 371/51 |
| 4,713,755 | 12/1987 | Worley, Jr. et al. | 364/200 |
| 4,833,601 | 5/1989 | Barlow et al. | 364/200 |
| 4,977,498 | 12/1990 | Rastegar et al. | 364/200 |
| 5,056,002 | 10/1991 | Watanabe | 364/200 |

OTHER PUBLICATIONS

Cache memory systems benefit from on-chip solutions, vol. 32 No. 25, Dec. 10 1987 end electrical design news. p. 248, right col. line 1, p. 249, left column, line 5; figures 2, 4.

*Primary Examiner*—Robert W. Beausoliel, Jr.
*Assistant Examiner*—Norman Wright
*Attorney, Agent, or Firm*—Kenneth C. Hill; Lisa K. Jorgenson; Richard K. Robinson

[57] ABSTRACT

A memory which is cleared by simultaneously clearing a special bit in each entry within the memory, an extra bit, used for other purposes, is also cleared. When both bits have a value of 0, parity checking is disabled. When either bit has a value of 1, parity checking is enabled. This prevents incorrect detection of parity errors after the memory device has been cleared.

20 Claims, 1 Drawing Sheet

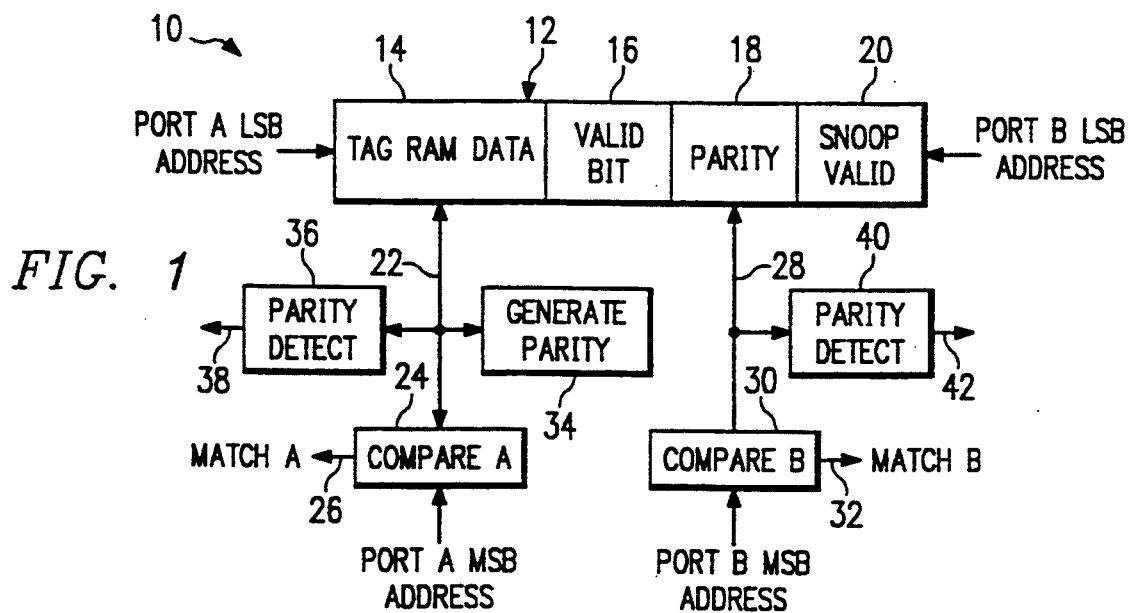
FIG. 1
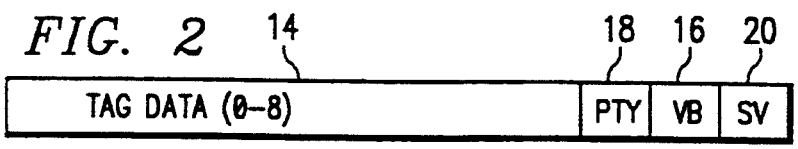
FIG. 2
FIG. 3
| VALID BIT | SNOOP VALID | PARITY |
|---|---|---|
| 0 | 0 | DISABLE |
| 0 | 1 | ENABLE |
| 1 | 0 | ENABLE |
| 1 | 1 | ENABLE |
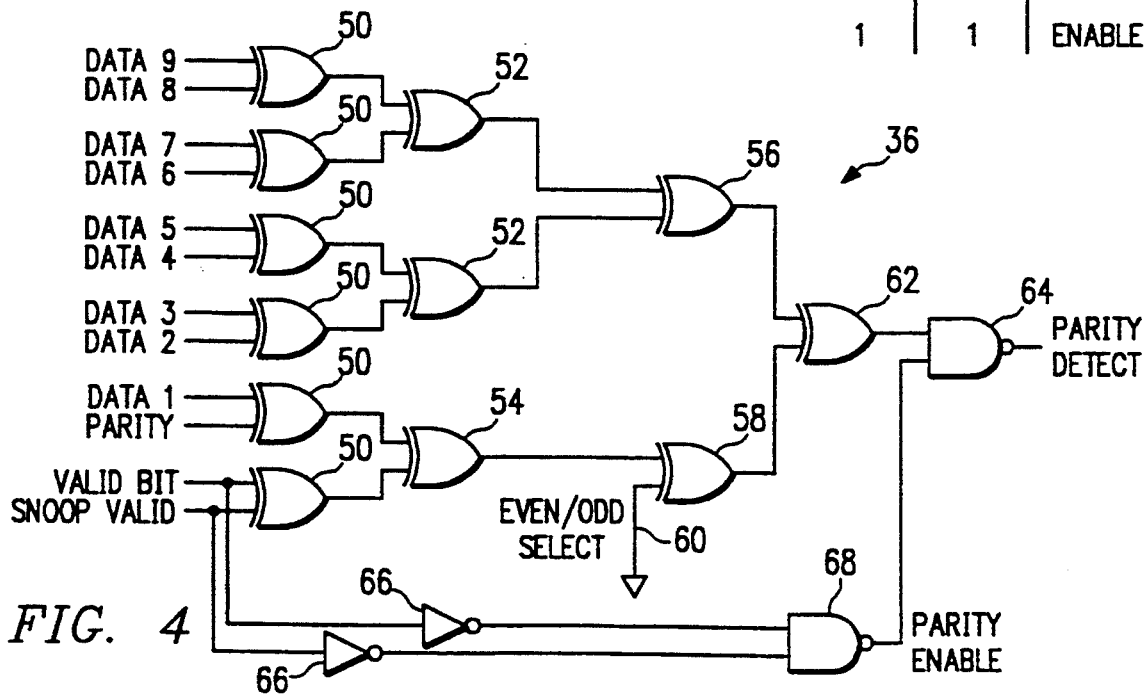
FIG. 4

CACHE TAG PARITY DETECT CIRCUIT

CROSS REFERENCE TO RELATED APPLICATIONS

The present application contains subject matter in common with co-pending U.S. application Ser. No. 473,239, filed Jan. 31, 1990 titled DUAL-PORT CACHE TAG MEMORY, by A. Daly and R. Tuttle, which is assigned to the assignee hereof, and which is incorporated by reference hereinto.

BACKGROUND OF THE INVENTION

1. Field of the Invention:

The present invention relates generally to integrated circuit memory devices, and more specifically to a circuit and method for detecting parity in memory devices.

2. Description of the Prior Art:

As is well known, occasional errors can occur in data stored in semiconductor memory devices. These errors can be caused by, for example, the malfunction of marginal active devices in an integrated circuit chip, electronic perturbations such as caused by power supply problems, and ionization caused by events such as alpha particle strikes. In most cases, the occurrence of these errors is essentially random. One common method used to detect the occurrence of such random errors is the generation and detection of a parity bit.

In its most common form, 1 parity bit is provided for each eight data bits, or for some other relatively small group of bits. Parity is defined as being odd or even, with the parity bit being assigned a value of 1 or 0 so that the number of ones in the data-plus-parity bits is either odd or even according to the defined parity scheme. This parity scheme allows for the detection of single bit errors, but will not detect two bit errors. In addition, no error correction is provided. Such a single bit parity detection scheme provides a good tradeoff between low cost and adequate error protection for most applications. This is true primarily because of the high reliability of semiconductor memory devices.

One type of memory used in computer systems is a cache memory. This is a relatively small, fast memory which resides in the system between the central processor and main system memory. Cache memory include data memory fields for storing data cached from system memory, and tag memory fields for storing the addresses corresponding to the data stored in the data cache. Like other memories, cache memories typically include parity checking.

Some cache tag memories, which can be implemented as single integrated circuit devices in some cases, have design considerations which render standard parity checking schemes inadequate. These types of memories allow for clearing the entire tag memory by resetting a particular bit position, referred to as the valid bit, for each storage location within the memory. In certain integrated circuit devices, all of the valid bits within the tag memory can be reset simultaneously in a single operation. This is sometimes referred to as a flash clear operation. Resetting 1 bit within each entry will invalidate the parity checking scheme, since parity checking of all tag memory entries and subsequent setting or resetting of the parity bit for each entry cannot be performed simultaneously on all entries in the memory.

It would be desirable to provide a parity checking scheme for these types of devices which provides complete parity coverage for all bits of the device, and which does not generate false parity errors.

SUMMARY OF THE INVENTION

It is therefore an object of the present invention to provide a circuit for checking parity in semiconductor memory devices.

It is another object of the present invention to provide such a circuit which is suitable for use in cache tag memory devices.

It is another object of the present invention to provide such a circuit which operates correctly after a flash clear operation.

Therefore, in accordance with the present invention, in a memory which is cleared by simultaneously clearing a special bit in each entry within the memory, an extra bit, used for other purposes, is also cleared. When both bits have a value of 0, parity checking is disabled. When either bit has a value of 1, parity checking is enabled. This prevents incorrect detection of parity errors after the memory device has been cleared.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 1 is a block diagram of a cache tag memory which can utilize a parity checking technique according to the present invention;

FIG. 2 illustrates a single entry in a preferred embodiment of a memory such as illustrated in FIG. 1;

FIG. 3 is a table indicating a preferred control function for disabling parity checking according to the present invention; and FIG. 4 is a logic diagram of a preferred parity checking circuit according to the present invention.

DESCRIPTION OF THE PREFERRED EMBODIMENT

FIG. 1 is a block diagram of a cache tag memory for use in which the parity checking scheme of the present invention is suitable. The device 10 of the preferred embodiment is a dual port cache tag memory suitable for use in a computer caching system. This device contains a bit, referred to as a snoop valid bit, for each entry in the memory. The snoop valid bit is reset to indicate that an entry is no longer valid whenever another device in the system, other than a local processor, writes data to a memory location which is stored in the cache. Additional details of such a cache tag memory, and its use in a multiprocessor computer system, are described in co-pending U.S. patent application Ser. No. 473,239, filed Jan. 31, 1990, and entitled DUAL-PORT CACHE TAG MEMORY, which has been incorporated hereinto by reference.

The device 10 includes a memory array 12. In the preferred embodiment, the memory array 12 is 12 bits wide, but it will be appreciated by those skilled in the art that various sized arrays 12 may be used in accordance with the principles of the present invention.

In the preferred embodiment, 9 bits of tag data 14 are stored for each entry in the array. Each entry in the array 12 also includes a valid bit 16, a parity bit 18, and a snoop valid bit 20.

The valid bit 16 is used by the system to reset the entire memory array 14. Whenever an entry has a value of 0 in the valid bit field 16, that entry is considered to be invalid. According to principles known in the art, clearing of the entire memory array 12 is accomplished by simultaneously resetting all of the valid bits 16 for all entries in the array. This operation is often referred to as a "flash clear". None of the memory locations in the tag data field 14 are reset when the memory is cleared.

FIG. 2 illustrates the fields defined for each entry in the array 12. For a 12 bit wide memory, 9 tag data bits are provided. The parity bit 18 is generated as odd or even parity as known in the art. The parity bit 18 is generated using the values of all of the remaining bits in the entry, including the bits in the tag data field 14, the valid bit 16, and the snoop valid bit 20.

In the illustration of FIG. 1, the memory array 12 is a dual-port memory. This means that it may be accessed simultaneously and asynchronously by two different ports. Port A is connected to a local processor and is addressed by the local processor to determine whether a memory location to be accessed is contained within the cache memory. Port B is connected to a system bus and is used by the device 10 to "snoop" data being written on the system bus.

To determine whether an address being accessed by the local processor is contained within the data cache, the least significant bits of the local address are applied to Port A of the memory array 12, as known in the art. The number of least significant address bits which are used to index into the array 12 is determined by the number of entries in the array 12. When an entry is addressed by the Port A least significant address bits, the tag data field 14 contains the most significant bits of the address location stored at the corresponding location in the data cache (not shown). These most significant bits are read out of the memory array 12 on signal lines 22, and compared in comparator 24 to the most significant bits of the Port A address. If the most significant bits of the Port A address match the data on signal lines 22, then the data of the memory location being addressed on Port A currently resides in the data cache corresponding to the device 10. The indication of whether or not such a match exists is generated on signal line 26. If either the valid bit 16 or the snoop valid bit 20 have a value of 0, the entry is invalid and a miss is signalled on line 26.

The same process works for addresses connected to the device 10 through Port B, which are coming from the system bus. The least significant bits of the Port B address are applied to the memory array 12, and the corresponding tag data field 14 is read out on signal line 28. As is the case with signal lines 22, signal line 28 represents a number of individual lines equal to the number of bits in the tag data field 14, plus the valid bit, parity bit, and snoop valid bit. The value on signal line 28 is compared to the most significant bits of the Port B address in a comparator 30, and a signal indicative of whether or not a match is found is generated on Signal line 32. As before, no match is signalled if either of the valid or snoop valid bits have a value of 0. In the case of Port B, if a match is found in comparator 30, the snoop valid bit 20 corresponding to the entry addressed by the least significant of the Port B address is reset to a value of 0.

Whenever a new value is stored into the memory array 12 from Port A, corresponding to loading a new memory location into the cache memory, parity generator 34 generates the appropriate parity bit corresponding to the remaining bits. Whenever an entry is written into the memory 12 the valid bit 16 and snoop valid bit 20 for that entry are always set to a value of 1. New entries can be written into the memory array 12 only through Port A, which is the port connected to the local process.

When a comparison is being made through Port A, a parity detect circuit 36 reads all of the bits of the entry, including the valid bit 16, parity bit 18, and snoop bit 20, and generates a signal on line 3e indicating whether parity is valid for that entry. If a parity error occurs, various recovery techniques can be performed by the system.

Since data can be written into the memory array 12 only through Port A, no parity generation circuitry is required for Port B. However, a parity detect circuit 40 is required to check the parity for entries which are addressed through Port B. A signal is then put on line 42 to indicate whether parity is valid for an entry addressed through Port B.

It will be appreciated by those skilled in the art that resetting the snoop valid bit 20 can change the data in an entry within the memory array 12. If the snoop valid bit previously had a value of 1 it will be necessary to change the value of the corresponding parity bit 18 for that entry. Other than resetting the snoop valid bit 10 and changing the parity bit 18 if the snoop valid bit 20 is reset from a 1 to a 0, no data is written into the memory array 12 through Port B. All other writing of data into the memory array 12 is performed only through Port A.

In the preferred embodiment of the device shown in FIG. 1, both the valid bit 16 and the snoop valid bit 20 are reset to 0 for all entries in the memory array 12 simultaneously in order to clear, or reset, the entire device 10 using a flash clear operation. If both of these values are 0, the parity detect circuits 36 and 40 will assume that no data has been written to an addressed entry since the device 10 was last reset. Therefore, when both the valid bit 16 and the snoop valid bit 20 are 0, parity checking is disabled and no parity error is generated, regardless of the values of the remaining bits in the entry. This is illustrated in the table of FIG. 3, in which parity checking is disabled only when both the valid bit and snoop valid bit are 0, and is enabled in all other cases.

As just described, it is preferred to use the snoop valid bit as well as the valid bit to disable parity checking after a reset. If only the valid bit were used to disable parity checking, a 1 bit error which changed the value of the valid bit from a 1 to a 0 would disable parity checking rather than cause the single bit error to be flagged by the parity checker. This is undesirable because a 1 bit parity error is not flagged as such.

Whenever a valid entry is written through Port A to a row of the memory array 12, the valid bit 16 and the snoop valid bit 20 are always set to a value of 1. The valid bit is reset to 0 only during a flash clear operation. Thus, once a value has been written to an entry in the array 12, only the last two rows of the table of FIG. 3 are combinations of the valid bit and snoop valid bit which can occur without a parity error. The situation shown in row 2 of the table can occur only if an error occurs in either the valid bit or the snoop valid bit. If both bits have a value of 1, and the valid bit changes to 0 through an error of some type, the entry of row 2 can be reached. This single bit error will be detected by the parity detect circuit because parity will now be incorrect, and parity checking is enabled. Row 2 can also be reached if both bits are supposed to have a value of 0, but the snoop valid bit changes to a 1 through a random error. This will also cause the parity checker to detect invalid parity, and this will be properly flagged since the parity checker will be enabled.

If the valid bit is supposed to have a value of 1, and the snoop valid bit a value of zero, corresponding to row 3 of the table, it is possible for a parity error to occur which will not be detected. If the valid bit improperly changes to a value of 0, both will have a value of 0 and the parity detect circuitry will be disabled. It might be considered desirable to flag this error as an actual parity error, but no harm will be done because the corresponding entry is actually invalid and will be discarded from the cache when both the valid bit and snoop valid bit have a value of 0.

FIG. 4 illustrates a preferred embodiment for a parity detect circuit which can be used for the parity detect circuit 36 or parity detect circuit 40 of FIG. 1. The detect circuitry of FIG. 4 assumes that 9 data bits are present in addition to the parity bit, the valid bit, and the snoop valid bit. These 12 bits are applied to the inputs of exclusive-OR gates 50. The outputs of the gates 50 are connected to the inputs of exclusive-OR gates 52 and 54 as shown. The outputs of gates 52 are connected to exclusive-OR gate 56. Exclusive-OR gate 58 has one input connected to gate 54, and the other input connected to ground. The grounded input represents a logical 0, and causes the parity detect circuit 36 to perform even parity checking. Connecting input 62 a logical 1 causes the detect circuit 36 to perform odd parity checking.

Gates 56 and 58 are connected to exclusive-OR gate 62, which is in turn connected to NAND gate 64. If parity is proper for all 12 bits, the output from gate 62 will be a 0 and the output from gate 64 will be a 1, assuming parity is enabled.

The valid bit and snoop valid bit inputs are inverted in inverters 66 and connected to NAND gate 68. Gate 68 generates the parity enable signal which is input into gate 64. If the output from NAND gate 68 is a logical 0, the output from gate 64 will always be a logical 1. This, in effect, disables the parity detect circuit 36 by forcing the output to register valid parity regardless of the output of gate 62. If the output of gate 68 is a logical 1, the output of gate 64 is simply the inverse of the output of gate 62. Since the valid bit and the snoop valid bit signals are inverted in inverter 66, it will be appreciated that the output of gate 68 is a 1, enabling parity, whenever either the valid bit or snoop valid bit have a value of 1. This implements the control function defined in the table of FIG. 3.

It will be appreciated by those skilled in the art that the inverters 66 and NAND gate 68 can be replaced by OR gate to perform the same logical function. In the preferred embodiment, the illustrated circuitry is used in order to provide a delay between the valid bit or snoop valid bit input signal and the parity enable signal output from gate 68. Since several gate delays must occur before any such change can propagate through the exclusive-OR gates, adding a delay in the data path through NAND gate 68 can prevent spurious parity output signals. The inverters 66 may have 1, 3, 5, or any desired odd number of inversion stages to generate a delay having any desired length. The number of gate delays added to the signals passing through the inverters 66 can be chosen to approximate the number of gate delays involved in passing through the various exclusive-OR gates in order to minimize timing problems. The number of gate delays required for this will depend upon the implementation of the exclusive-OR gates.

The circuitry described above can be seen to provide full parity checking, including the valid bit, in a memory circuit which can be flash cleared by simply resetting the valid bits for every entry. By also resetting the snoop valid bits at the same time, simple logic circuitry can be used to allow the combination of the valid bit and snoop valid bit to enable or disable the parity detect circuitry. This allows more parity errors to be detected than is the case if the valid bit is simply left out of the parity detect circuitry.

It will be appreciated by those skilled in the art that the use of the valid bit and snoop valid bit to enable parity checking can be used with any parity checking circuitry. The exclusive-OR gates used in FIG. 4 to actually detect parity can be replaced by any number of other circuits which perform the equivalent function. The number of data bits can be selected to suit any desired implementation.

While the invention has been particularly shown and described with reference to a preferred embodiment, it will be understood by those skilled in the art that various changes in form and detail may be made therein without departing from the spirit and scope of the invention.

What is claimed is:

1. A parity checking circuit for a memory having first and second bit positions indicating whether a location in the memory is valid, comprising:

a parity detecting circuit, such parity detecting circuit having an output, and such parity detecting circuit generating a signal indicative of whether a entry read from a memory location has valid parity; and an enable circuit for enabling an output of said parity detecting circuit, said enable circuit having two inputs indicating the values of the first and second bit positions for the entry read from the memory location, said enable circuit operating to disable the parity detecting circuit output when the first and second bit positions for such entry have a preselected value.

2. The parity checking circuit of claim 1, wherein the memory is a cache tag memory.

3. The parity checking circuit of claim 2, wherein the first and second bit positions comprise a valid bit position and a snoop valid bit position, respectively.

4. The parity checking circuit of claim 1, wherein the memory is a dual port memory, with each of a first and second port able to read entries in the memory simultaneously, wherein said parity detecting circuit and said enable circuit are connected to the first port, and further comprising:

a second parity detecting circuit connected to the second port; and a second enable circuit for enabling the output of said second parity detecting circuit.

5. The parity checking circuit of claim 1, wherein said parity detecting circuit includes an output buffer, and wherein said enable circuit forces an output of the output buffer to a selected value when the first and second bit positions both have the selected value.

6. The parity checking circuit of claim 5, wherein the selected buffer output value is a value which indicates that parity is valid.

7. The parity checking circuit of claim 5, wherein the output buffer is a logic gate, and the output of said enable circuit is connected as an input to such logic gate, wherein the output of the logic gate is forced to a known value if the enable circuit output indicates a disable signal, and reflects the output of said parity detecting circuit otherwise.

8. A cache tag memory, comprising:
   a memory array having a plurality of addressable entries, and further having, for each entry a parity bit and first and second valid bits indicating whether the entry is valid;
   a first input/output port connected to said memory array;
   a second input/output port connected to said memory array;
   a parity generating circuit for generating a parity bit indicating parity for a data value stored into a memory array entry, and for storing such parity bit into the array;
   a first and a second parity detect circuit connected to said memory array and associated with said first and second input/output ports, respectively; and
   disabling means connected to said first and second parity detect circuits for disabling them when the first and second valid bits for an entry are in a preselected state.

9. The cache tag memory of claim 8, wherein data entries to said memory array can be written only through said second input/output port, and wherein said second input/output port can only change the values of the parity bit and one of the valid bits for an entry.

10. The cache tag memory of claim 9, wherein said parity generating circuit generates a parity bit only for data written into said memory array for said first input/output port.

11. The cache tag memory of claim 8, wherein said disabling means comprises:

a logic circuit connected to an output buffer for said parity detecting circuit, for forcing such output buffer to a preselected state when the first and second valid bits for an entry are in the preselected state.

12. The cache tag memory of claim 11, wherein the preselected state comprises a state in which both valid bits indicate a memory array entry to be invalid.

13. The cache tag memory of claim 12, wherein the preselected state comprises a state in which both valid bits have a value of zero.

14. The cache tag memory of claim 11, wherein the output buffer is a logic gate having one input connected to the output of said logic circuit, and a second input connected to the output of said parity detecting circuit.

15. The cache tag memory of claim 8, wherein said memory array is cleared by setting only the first and second valid bits for each entry to indicate invalid entries.

16. A method for checking parity in a memory device having a plurality of addressable entries, comprising the steps of:
   storing a parity bit in a memory array along with data written to an entry;
   storing first and second valid bit data for each data entry in the memory array;
   when an entry in the memory array is read, generating a signal indicating whether parity for that entry is valid; and
   disabling the generated signal when the first and second valid bits are in a preselected state.

17. The method of claim 16, wherein the preselected state is one in which both valid bits indicate that an entry is invalid.

18. The method of claim 16, wherein said disabling step comprises the step of:
   forcing the parity signal to a selected state when both valid bits are in the preselected state.

19. The method of claim 18, wherein the selected state indicates that parity is valid.

20. The method of claim 16, wherein the memory array is cleared by setting only the first and second valid bits for all memory entries to a state indicating that the entries are invalid.

* * * * *